No. 739,937. PATENTED SEPT. 29, 1903.
J. T. SMITH.
MACHINE FOR MAKING ARTIFICIAL FUEL.
APPLICATION FILED MAR. 23, 1903.
NO MODEL. 2 SHEETS—SHEET 1.
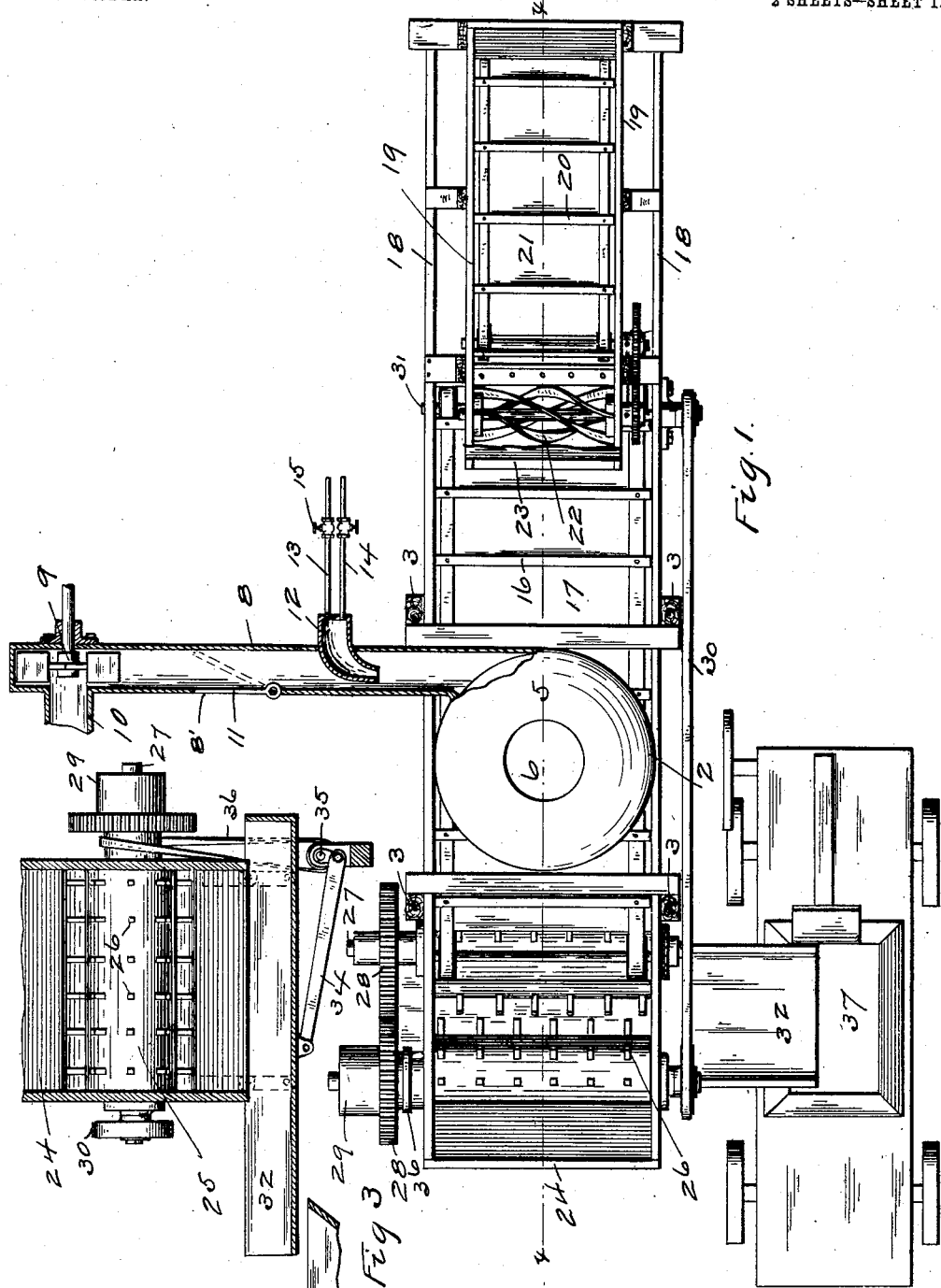
WITNESSES
INVENTOR
JOHN T. SMITH
BY Paul & Paul
HIS ATTORNEYS

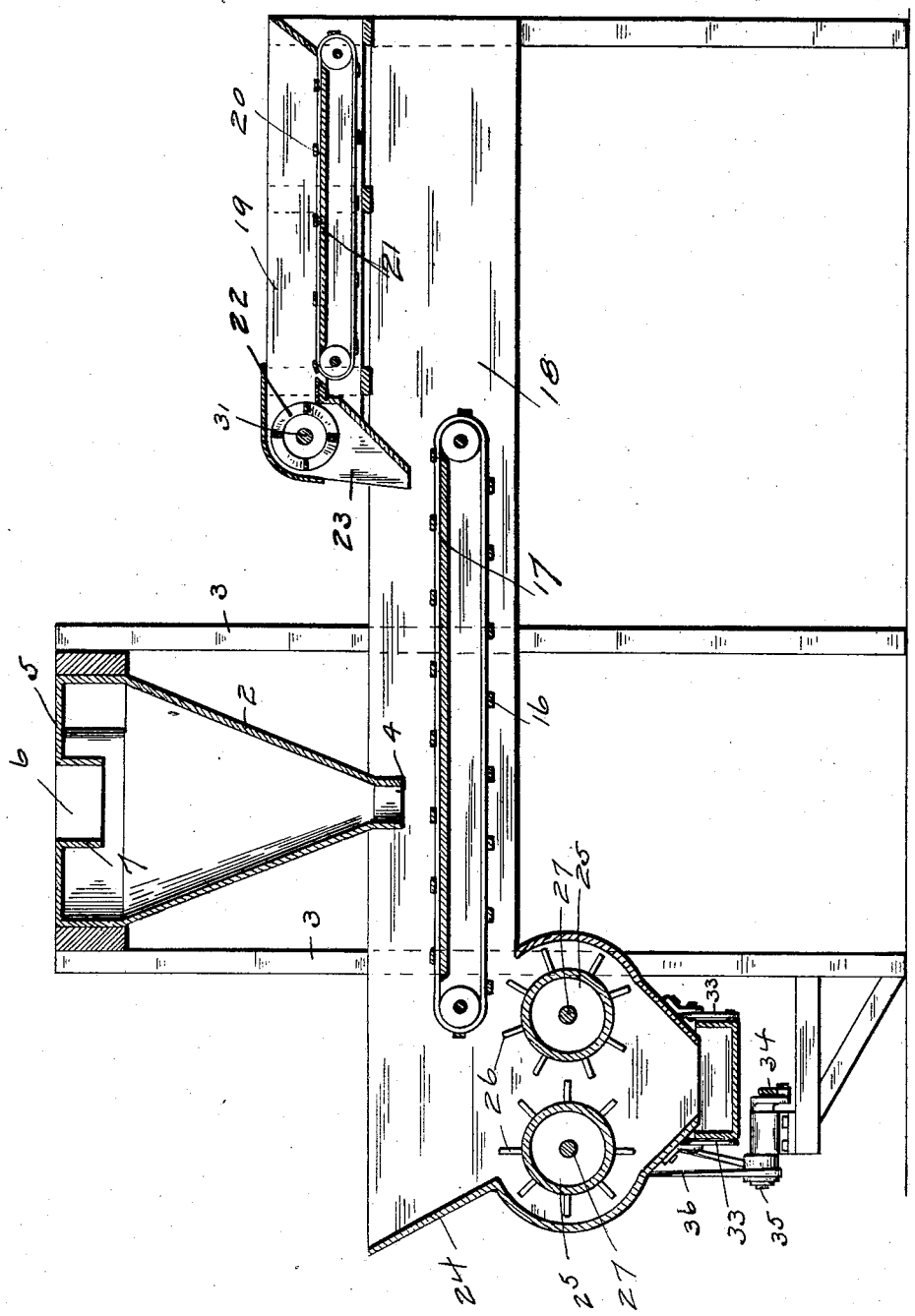

No. 739,937. Patented September 29, 1903.

UNITED STATES PATENT OFFICE.

JOHN T. SMITH, OF HERON LAKE, MINNESOTA.

MACHINE FOR MAKING ARTIFICIAL FUEL.

SPECIFICATION forming part of Letters Patent No. 739,937, dated September 29, 1903.

Application filed March 23, 1903. Serial No. 149,139. (No model.)

*To all whom it may concern:*

Be it known that I, JOHN T. SMITH, of Heron Lake, county of Jackson, State of Minnesota, have invented certain new and useful Improvements in Machines for Making Artificial Fuel, of which the following is a specification.

My invention relates to an apparatus for manufacturing waste material, such as the sawdust of woodworking machinery and the refuse of grain-threshers and flax breaks and mills, into a fuel that will be suitable for steaming and domestic purposes.

A further object is to provide an apparatus wherein straw or old hay can be easily and quickly converted into a form suitable for fuel.

The invention consists generally in various constructions and combinations, all as hereinafter described, and particularly pointed out in the claims.

In the accompanying drawings, forming part of this specification, Figure 1 is a plan view of a machine embodying my invention. Fig. 2 is a longitudinal section of the same on the line $x\ x$ of Fig. 1. Fig. 3 is a cross-section showing the mixing-cylinders and the shaker beneath them.

In the drawings, 2 represents a receptacle, conical in form, arranged vertically between the standards 3 with its apex downward and having a discharge-orifice 4 and a closed top 5, except for a central air-escape opening 6, that is preferably surrounded by a depending flange 7. A horizontal spout 8 communicates tangentially with said conical receptacle near the top and is provided with a blast-fan 9, that connects with a spout 10, through which the shives, woody portions, and all waste material from the flax-break discharge into the spout 8. I prefer to provide a valve 11 in the spout 8, which normally closes a side opening 8' therein, but, as indicated by dotted lines in Fig. 1, may be swung across the spout to close the passage, causing the material from the fan to be discharged through said side opening in case the conical receptacle be over-supplied with material. The current of air rushing through the spout 8, ladened with the refuse material from the break, will circle around within the receptacle, carrying the material with it, and finally escape through the opening 6 in the top wall. The shives and other refuse of the flax-straw will settle down to the bottom of the receptacle and pass out through the opening 4. During the time that this air-current is flowing around within the receptacle ladened with the refuse of the flax-break I subject the same to treatment by a dampening agent, such as steam, that is admitted through a nozzle 12, arranged in the spout 8 and connected with pipes 13 and 14, having valves 15. One of these pipes preferably communicates with a steam-supply and the other with a pump or reservoir through which oil, preferably petroleum, is supplied under pressure. By means of the valves 15 the steam and petroleum can be admitted simultaneously to the nozzle or either one without the other, and the pressure will be such in the nozzle that the spray will enter the receptacle with considerable velocity and mingling with the refuse from the flax-break therein will dampen the same sufficiently to cause cohesion of the particles when subjected to pressure, and the oil absorbed by the shives and woody portions of the flax fiber will greatly increase the combustibility of the same. The volume of material from the break carried into the conical receptacle can be easily regulated, and the amount of steam and oil fed thereto can also be governed according to the character of the material, whether very dry or not, and the degree of combustibility desired. Upon being discharged from the conical receptacle the material falls upon a slatted carrier 16, that operates over a floor 17, provided within a frame 18. This conveyer and floor extend for some little distance on one side of the discharge-orifice in said receptacle, and a suitable binding material, such as clay or manure, when a binder is used is placed upon the receiving end of said conveyer and carried along beneath said discharge-orifice to mingle with the material therefrom. It is sometimes desirable to mix straw or old hay that is unsuited for feeding purposes with the discharge from the conical receptacle, and in some instances I may prefer to press the hay or straw without being mixed with the refuse from the break. I therefore provide a straw and hay cutting device consisting of a hopper 19, arranged near the receiving end of said carrier and provided with a carrier 20, operating over a floor 21, to deliver the straw and hay placed thereon to a revolving cutter 22, arranged in the discharge-spout 23. The straw and hay placed on the carrier 20 will be delivered to the revolving cutter, reduced to the required degree of fineness, and discharged through the spout 23 upon the carrier 16. Beneath the discharge end of the carrier 16 is a hopper 24, wherein cylinders 25 are arranged parallel with each other and provided with peripheral teeth 26, that are arranged to coact as the cylinders are revolved and mix the material that is fed between them. The cylinders are mounted upon suitable shafts 27, provided with gears 28, one of said shafts having a driven pulley 29 on one end and connected at its other end by a belt 30 with the shaft 31 of the revolving cutter 22. Beneath the hopper 24 I prefer to provide a shaker 32, supported upon links 33 and connected by a pitman 34 with a crank-shaft 35, that is driven by a belt 36 from the shaft 27. The discharge end of the shaker 32 overhangs the hopper of a press 37 of ordinary construction.

By means of this apparatus I can utilize the refuse from a flax break or mill, delivering it to the receptacle 2 by any suitable means and compressing such refuse after being dampened with or without mixture of a binder therewith. I can also cut up straw and old hay, neither of which have any marketable value, to the required degree of fineness and mix them with the dampened refuse from the break or not, as desired. I can thus utilize all the waste around the flax-mill and the accumulation of straw and old hay on a farm and make an artificial fuel that will be compact and easily handled, very combustible, and commanding a price on the market either for steam or domestic purposes that will amply compensate for the expenses of manufacture.

I claim as my invention—

1. The combination, with a receptacle having a discharge-opening, of means for delivering the refuse of a flax-break thereto, means for dampening the refuse in said receptacle, means for mixing a binder with said refuse after it is discharged from said receptacle, and means for compressing the mixture.

2. The combination, with an upright receptacle in the form of an inverted cone having a discharge-orifice in its apex and an opening in its top for the escape of air, of means for delivering the refuse of a flax-break to said receptacle, means for dampening such refuse within said receptacle, and means for compressing the material after its discharge from said receptacle.

3. The combination, with a receptacle having a discharge-orifice, of a spout leading into said receptacle and arranged to deliver refuse fibrous material thereto, a blast-fan connected with said spout arranged to keep the material in motion within said receptacle, means for dampening said material while in motion within said receptacle, and means for compressing the material after its discharge from said receptacle.

4. The combination, with a receptacle having a discharge-orifice, of means for delivering refuse fibrous material to said receptacle, means for dampening the material while in said receptacle, means for mixing a binder with the dampened material after its discharge from said receptacle, and a press whereto the material is delivered after its discharge from said mixing means.

5. The combination, with a receptacle having a discharge-orifice, of means for delivering the refuse of a flax-break to said receptacle, a nozzle communicating with said receptacle and with a steam and oil supply, and a press whereto the material is delivered after its discharge from said receptacle.

6. The combination, with an upright receptacle in the form of an inverted cone having a discharge-orifice in its apex and an opening in its top for the escape of air, of a spout leading tangentially into said receptacle and provided with a blast-fan through which the shives and chaff of a flax-break are delivered, a nozzle communicating with said receptacle and with a dampening and combustible agent, and means for compressing the material after its discharge from said receptacle.

7. The combination, with a receptacle, of a spout leading thereto having an opening in its wall, a hinged gate arranged in said spout and adapted to close the passage therethrough and direct the material through said opening, a fan provided in said spout, means for dampening the material in said receptacle, and a press arranged to receive the material from said receptacle.

8. An apparatus for manufacturing artificial fuel, comprising a receptacle having a discharge-opening, means for delivering refuse fibrous material to said receptacle, a blast-fan arranged to create a revolving current of air within said receptacle, means for dampening the material contained in said receptacle, and means for compressing the material after its discharge from said receptacle.

9. The combination, with a receptacle having a discharge-orifice, of means for delivering the refuse of a flax-break thereto, means for dampening such refuse within said receptacle, a carrier provided beneath the discharge-orifice of said receptacle, mixing-cylinders near the discharge end of said carrier, a shaker beneath said cylinders, and a press arranged to receive the material from said shaker.

10. The combination, with a straw or hay cutting apparatus, of a carrier arranged to receive the cut material therefrom, a mixing apparatus provided near the discharge end of said carrier, an upright receptacle having a discharge-orifice above said carrier between said hay cutting and mixing apparatus, means for delivering refuse fibrous material to said receptacle, and a press arranged to receive the material from said mixing apparatus.

11. An apparatus for manufacturing artificial fuel, comprising a receptacle having a discharge-opening, a blast-fan arranged to discharge refuse fibrous material into said receptacle and to create a revolving current of air therein, means for dampening the material within said receptacle, and means for compressing the material after its discharge from said receptacle.

12. An apparatus for manufacturing artificial fuel, comprising means for dampening the shives and other refuse of a flax-break, means for mixing a binder therewith, a shaker provided beneath said mixing means, and a press whereto the material is delivered from said shaker.

13. An apparatus for manufacturing artificial fuel, comprising a receptacle provided with a discharge-opening, means for delivering refuse fibrous material to said receptacle, means for dampening the material contained in said receptacle, a carrier arranged to receive the material discharged from said receptacle, means for mixing a binder with said material, and means for compressing the mixture.

In witness whereof I have hereunto set my hand this 16th day of March, 1903.

JOHN T. SMITH.

In presence of—
RICHARD PAUL,
S. V. GRIFFIN.